United States Patent
Zhang et al.

(10) Patent No.: US 12,001,625 B2
(45) Date of Patent: Jun. 4, 2024

(54) TOUCH PANEL AND REPAIRING METHOD THEREFOR, AND DISPLAY DEVICE

(71) Applicants: MIANYANG BOE OPTOELECTRONICS TECHNOLOGY CO., Ltd., Sichuan (CN); BOE Technology Group Co., Ltd., Beijing (CN)

(72) Inventors: Lei Zhang, Beijing (CN); Tieyi Zhang, Beijing (CN); Tao Peng, Beijing (CN); Chuanrui Gong, Beijing (CN); Yancen Liu, Beijing (CN)

(73) Assignees: MIANYANG BOE OPTOELECTRONICS TECHNOLOGY CO., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/802,541

(22) PCT Filed: Oct. 13, 2021

(86) PCT No.: PCT/CN2021/123466
§ 371 (c)(1),
(2) Date: Aug. 26, 2022

(87) PCT Pub. No.: WO2022/100343
PCT Pub. Date: May 19, 2022

(65) Prior Publication Data
US 2023/0078853 A1    Mar. 16, 2023

(30) Foreign Application Priority Data
Nov. 12, 2020 (CN) .......................... 202011262773.9

(51) Int. Cl.
*G06F 3/041* (2006.01)
*G06F 3/044* (2006.01)
*G09G 3/3208* (2016.01)

(52) U.S. Cl.
CPC ........ *G06F 3/0412* (2013.01); *G06F 3/04164* (2019.05); *G06F 3/04166* (2019.05);
(Continued)

(58) Field of Classification Search
CPC .............. G06F 3/0412; G06F 3/04166; G06F 3/04164; G06F 3/044; G06F 2203/04111; G09G 3/3208
See application file for complete search history.

(56) References Cited

U.S. PATENT DOCUMENTS

2012/0081300 A1* 4/2012 Chan ...................... G06F 3/0446
345/173
2016/0147325 A1 5/2016 Tai et al.
(Continued)

FOREIGN PATENT DOCUMENTS

| CN | 104635981 A | 5/2015 |
| CN | 111244115 A | 6/2020 |
| CN | 112328113 A | 2/2021 |

OTHER PUBLICATIONS

International Search Report for PCT/CN2021/123466 dated Jan. 19, 2022.

*Primary Examiner* — Afroza Chowdhury
(74) *Attorney, Agent, or Firm* — Ling Wu; Stephen Yang; Ling and Yang Intellectual Property (57) ABSTRACT

A touch panel, comprising: a substrate, a plurality of touch electrodes and a plurality of traces disposed on the substrate. At least one trace is connected to at least one touch electrode, and comprises a first conducting wire and a second conducting wire. A trace insulating layer is provided between the first and second conducting wires. The second (Continued)

conducting wire is connected to the first conducting wire by at least one via on the trace insulating layer. First conducting wires of at least two adjacent traces both have at least one break point, so that a first short circuit point between the first conducting wire is isolated from a corresponding second conducting wire; or, second conducting wires of at least two adjacent traces both have at least one break point, so that a second short circuit point between the second conducting wire is isolated from a corresponding first conducting wire.

20 Claims, 7 Drawing Sheets

(52) U.S. Cl.
CPC .... *G06F 3/044* (2013.01); *G06F 2203/04111* (2013.01); *G09G 3/3208* (2013.01)

(56) References Cited

U.S. PATENT DOCUMENTS

2016/0170544 A1* 6/2016 Wang ................ G06F 3/04164
345/173
2018/0196554 A1 7/2018 Ishizaki et al.

* cited by examiner

TOUCH PANEL AND REPAIRING METHOD THEREFOR, AND DISPLAY DEVICE

CROSS-REFERENCE TO RELATED APPLICATIONS

The present application is a U.S. National Phase Entry of International Application No. PCT/CN2021/123466 having an international filing date of Oct. 13, 2021, which claims priority to the Chinese Patent Application No. 202011262773.9, entitled "TOUCH PANEL AND REPAIRING METHOD THEREFOR, AND DISPLAY DEVICE", filed to the CNIPA on Nov. 12, 2020. The above-identified applications are incorporated into this application by reference in their entirety.

TECHNICAL FIELD

The present disclosure relates to, but is not limited to, the field of display technologies, and particularly to a touch panel, a method for repairing a touch panel, and a display device.

BACKGROUND

Electronic display products with touch function are increasingly favored by consumers. At present, common technologies include resistive touch, capacitive touch and optical touch, etc. Capacitive touchpads have high accuracy, multi-touch, high durability, high touch resolution and other features, thereby becoming major touch technology used in intermediate and advanced consumer electronics.

SUMMARY

The following is a summary of subject matters described herein in detail. The summary is not intended to limit the protection scope of claims.

Embodiments of the present disclosure provide a touch panel, a method for repairing the touch panel, and a display device.

In one aspect, a touch panel is provided according to an embodiment of the present disclosure, which includes a substrate, a plurality of touch electrodes and a plurality of traces disposed on the substrate, wherein at least one trace is connected with at least one touch electrode. The at least one trace includes a first conductive line and a second conductive line that are stacked on the substrate, a trace insulating layer is disposed between the first conductive line and the second conductive line, and the second conductive line is connected with the first conductive line through at least one via on the trace insulating layer. Each of first conductive lines of at least two adjacent traces has at least one break point, to enable the first short-circuit point between the first conductive lines of the at least two adjacent traces to be isolated from corresponding second conductive lines; or, each of second conductive lines of at least two adjacent traces has at least one break point, to enable the second short-circuit point between the second conductive lines of the at least two adjacent traces to be isolated from corresponding first conductive lines.

In some exemplary implementations, the first short-circuit point includes a first conductive block between two adjacent first conductive lines, and the first conductive block is covered with a trace insulating layer. The second short-circuit point includes a second conductive block between two adjacent second conductive lines, and the second conductive block is disposed on a trace insulating layer between the two adjacent second conductive lines.

In some exemplary implementations, an orthographic projection of a first conductive line of the at least one trace on the substrate includes an orthographic projection of a corresponding second conductive line on the substrate; or, an orthographic projection of a second conductive line of the at least one trace on the substrate includes an orthographic projection of a corresponding first conductive line on the substrate.

In some exemplary implementations, the first conductive line and the touch electrode are in a same layer, or, the second conductive line and the touch electrode are in a same layer.

In some exemplary implementations, the touch electrode includes a driving electrode and a sensing electrode; adjacent driving electrodes are connected by a first connecting part, or, adjacent sensing electrodes are connected by a first connecting part; the first conductive line and the touch electrode are in a same layer, and the second conductive line and the first connecting part are in a same layer; or, the second conductive line and the touch electrode are in a same layer, and the first conductive line and the first connecting part are in a same layer.

In some exemplary implementations, the second conductive line of the at least one trace is connected with the first conductive line through a plurality of vias arranged sequentially along an extension direction of the trace.

In some exemplary implementations, each of the first conductive lines of the at least two adjacent traces has a first break point and a second break point, and a first conductive line between the first break point and the second break point is not connected with a corresponding second conductive line; or, each of the second conductive lines of the at least two adjacent traces has a third break point and a fourth break point, and a second conductive line between the third break point and the fourth break point is not connected with a corresponding first conductive line.

In some exemplary implementations, vias of a plurality of traces are staggered in a direction perpendicular to the extension direction of the traces.

In some exemplary implementations, the plurality of touch electrodes are in a touch area, and the plurality of traces are in a trace lead-out area on at least one side of the touch area.

In some exemplary implementations, the plurality of touch electrodes are in an electrode area within a touch area, and the plurality of traces extend from a lead area within the touch area to a trace lead-out area on at least one side of the touch area.

In some exemplary implementations, the substrate is an Organic Light-Emitting Diode (OLED) display substrate.

In another aspect, a display device is further provided according to an embodiment of the present disclosure, which includes the touch panel described above.

In another aspect, a method for repairing a touch panel is further provided according to an embodiment of the present disclosure. The touch panel includes a substrate, a plurality of touch electrodes and a plurality of traces disposed on the substrate, wherein at least one trace is connected with at least one touch electrode; the at least one trace includes a first conductive line and a second conductive line that are stacked on the substrate, a trace insulating layer is disposed between the first conductive line and the second conductive line, and the second conductive line is connected with the first conductive line through at least one via on the trace insulating layer. The method for repairing the touch panel includes at least one of the followings: after the first conductive line is formed on the substrate, cutting at least two adjacent first conductive lines connected with a first short-circuit point, and sequentially forming a trace insulating layer and a second conductive line on a side of the first conductive line far away from the substrate, to enable the first short-circuit point to be isolated from second conductive lines corresponding to the at least two adjacent first conductive lines; after the first conductive line, the trace insulating layer and the second conductive line are sequentially formed on the substrate, cutting at least two adjacent second conductive lines connected to the second short-circuit point, to enable the second short-circuit point to be isolated from first conductive lines corresponding to the at least two adjacent second conductive lines.

In some exemplary implementations, the cutting at least two adjacent first conductive lines connected with the first short-circuit point, includes cutting the at least two adjacent first conductive lines connected with the first short-circuit point, forming a first break point and a second break point on the at least two adjacent first conductive lines, to enable a first conductive line between the first break point and the second break point to be not electrically connected with a corresponding second conductive line.

In some exemplary embodiments, the cutting at least two adjacent second conductive lines connected to the second short-circuit point, includes: cutting the at least two adjacent second conductive lines connected with the second short-circuit point, forming a third break point and a fourth break point on the at least two adjacent second conductive lines, to enable a second conductive line between the third break point and the fourth break point to be not electrically connected with the corresponding first conductive line.

Other aspects may be understood after the drawings and the detailed description are read and understood.

BRIEF DESCRIPTION OF DRAWINGS

Accompanying drawings are used for providing further understanding of technical solutions of the present disclosure, constitute a part of the specification, and are used for explaining the technical solutions of the present disclosure together with the embodiments of the present disclosure, but not to constitute limitations to the technical solutions of the present disclosure. Shapes and sizes of one or more components in the drawings do not reflect true scales, and are only intended to schematically describe contents of the present disclosure.

DETAILED DESCRIPTION

To make objectives, technical solutions, and advantages of the present disclosure clearer, embodiments of the present disclosure will be described in detail below with reference to the accompanying drawings. Implementations may be implemented in multiple different forms. Those of ordinary skills in the art may easily understand such a fact that implementations and contents may be transformed into one or more forms without departing from the essence and scope of the present disclosure. Therefore, the present disclosure should not be construed as being limited to contents described in following implementations only. The embodiments in the present disclosure and features in the embodiments may be combined randomly with each other without conflict.

In the drawings, a size or sizes of one or more constituent elements, a thickness of a layer, or an area is sometimes exaggerated for clarity. Therefore, an implementation of the present disclosure is not necessarily limited to the sizes, and the shapes and sizes of multiple components in the accompanying drawings do not reflect actual scales. In addition, the drawings schematically illustrate ideal examples, and an embodiment of the present disclosure is not limited to the shapes, numerical values, or the like shown in the drawings.

Ordinal numerals such as "first", "second" and "third" in the present disclosure are set to avoid confusion of constituents, but not intended for restriction in quantity. "A plurality of/multiple" in the present disclosure means two or more in quantity.

In the present disclosure, for convenience, wordings "central", "up", "down", "front", "back", "vertical", "horizontal", "top", "bottom", "inside", "outside" and the like indicating orientation or positional relationships are used to illustrate positional relationships between constituent elements with reference to the drawings. These wordings are not intended to indicate or imply that involved devices or elements must have specific orientations and be structured and operated in the specific orientations, but only to facilitate describing the present specification and simplify the description, and thus should not be understood as limitations to the present disclosure. The positional relationships between the constituent elements may be changed as appropriate based on the directions of the constituent elements described. Therefore, appropriate replacements can be made according to situations without being limited to the wordings described in the specification.

In the present disclosure, unless otherwise specified and defined, terms "mounting", "mutual connection" and "connection" should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand meanings of the above-mentioned terms in the present disclosure according to situations.

In the present disclosure, a transistor refers to an element including at least three terminals, namely, a gate electrode, a drain electrode and a source electrode. The transistor has a channel area between the drain electrode (drain electrode terminal, drain area, or drain) and the source electrode (source electrode terminal, source area, or source), and a current may flow through the drain electrode, the channel area, and the source electrode. In the present disclosure, the channel area refers to an area through which the current mainly flows.

In the present disclosure, a first electrode may be a drain electrode while a second electrode may be a source electrode, or a first electrode may be a source electrode while a second electrode may be a drain electrode. In cases that transistors with opposite polarities are used, a current direction changes during operation of a circuit, or the like, functions of the "source electrode" and the "drain electrode" are sometimes interchangeable. Therefore, the "source electrode" and the "drain electrode" are interchangeable in the present disclosure.

In the present disclosure, "electric connection" includes a case where constituent elements are connected through an element having a certain electrical action. The "element having some electrical action" is not particularly limited as long as it can transmit electrical signals between the connected constituent elements. Examples of the "element having the certain electrical action" not only include electrodes and wirings, but also include switching elements such as transistors, resistors, inductors, capacitors, other elements with one or more functions, etc.

In the present disclosure, "parallel" refers to a state in which an angle formed by two straight lines is above −10 degrees and below 10 degrees, and thus may include a state in which the angle is above −5 degrees and below 5 degrees. In addition, "perpendicular" refers to a state in which an angle formed by two straight lines is above 80 degrees and below 100 degrees, and thus may include a state in which the angle is above 85 degrees and below 95 degrees.

In the present disclosure, "film" and "layer" are interchangeable. For example, a "conductive layer" may be replaced with a "conductive film" sometimes. Similarly, an "insulating film" may be replaced with an "insulating layer" sometimes.

In the present disclosure, "about" means that a boundary is not defined strictly and numerical values within process and measurement error ranges are allowed.

A touch panel is provided according to at least one embodiment of the present disclosure, which includes a substrate, a plurality of touch electrodes and a plurality of traces disposed on the substrate. At least one trace is connected with at least one touch electrode. At least one trace includes a first conductive line and a second conductive line that are stacked on the substrate. A trace insulating layer is disposed between the first conductive line and the second conductive line, and the second conductive line is connected with the first conductive line through at least one via on the trace insulating layer. Each of first conductive lines of at least two adjacent traces has at least one break point, so that a first short-circuit point between the first conductive lines of the at least two adjacent traces is isolated from corresponding second conductive lines; or, each of second conductive lines of at least two adjacent traces has at least one break point, so that a second short-circuit point between the second conductive lines of the at least two adjacent traces is isolated from corresponding first conductive lines.

In the touch panel provided according to the embodiment, a design of double-layer conductive lines is employed for the traces, and when a short occurs between adjacent traces, a signal transmission path of the traces is ensured by cutting off one layer of the conductive lines of the traces, thereby improving the yield of the touch panel.

In some exemplary implementations, the first short-circuit point includes a first conductive block between two adjacent first conductive lines, and the first conductive block is covered with a trace insulating layer. The second short-circuit point includes a second conductive block between two adjacent second conductive lines, and the second conductive block is disposed on a trace insulating layer between the two adjacent second conductive lines. The first conductive block of the first short-circuit point is in contact with two adjacent first conductive lines, and when there is no break point on the adjacent first conductive lines, there is electrical connection between the adjacent first conductive lines. The second conductive block of the second short-circuit point is in contact with two adjacent second conductive lines, and when there is no break point on the adjacent second conductive lines, there is electrical connection between the adjacent second conductive lines.

In some exemplary implementations, an orthographic projection of the first conductive line of the at least one trace on the substrate includes an orthographic projection of the corresponding second conductive line on the substrate; or, an orthographic projection of the second conductive line of the at least one trace on the substrate includes an orthographic projection of the corresponding first conductive line on the substrate. However, this embodiment is not limited thereto. For example, orthographic projections of the first and second conductive lines of at least one trace on the substrate may be partially overlapped.

In some exemplary implementations, the first conductive line and the touch electrode are in a same layer, or, the second conductive line and the touch electrode are in a same layer. However, this embodiment is not limited thereto.

In some exemplary implementations, the touch electrode includes a driving electrode and a sensing electrode; adjacent driving electrodes are connected by a first connecting part, or, adjacent sensing electrodes are connected by a first connecting part. The first conductive line and the touch electrode are in a same layer, and the second conductive line and the first connecting part are in a same layer; or, the second conductive line and the touch electrode are in a same layer, and the first conductive line and the first connecting part are in a same layer.

In some exemplary implementations, a second conductive line of at least one trace is connected with the first conductive line through a plurality of vias that are sequentially arranged along an extension direction of the trace. In other words, there are a plurality of connection points between the first conductive line and the second conductive line of at least one trace. However, this embodiment is not limited thereto. For example, only one connection point may be provided between the first conductive line and the second conductive line of at least one trace.

In some exemplary implementations, each of the first conductive lines of the at least two adjacent traces has a first break point and a second break point, and the first conductive line between the first break point and the second break point is not connected with the corresponding second conductive line. Alternatively, each of the second conductive lines of the at least two adjacent traces has a third break point and a fourth break point, and the second conductive line between the third break point and the fourth break point is not connected with the corresponding first conductive line. In this exemplary implementation, by cutting the first conductive line or the second conductive line which is short-circuited, a short-circuited part of the first conductive line is disconnected from the corresponding second conductive line, or a short-circuited part of the second conductive line is disconnected from the corresponding first conductive line, thus achieving the repair of the short-circuited trace and ensuring the signal transmission performance on the trace.

In some exemplary implementations, vias of a plurality of traces are staggered in a direction perpendicular to the extension direction of the traces. However, this embodiment is not limited thereto.

In some exemplary implementations, the plurality of touch electrodes are in a touch area, and the plurality of traces are in a trace lead-out area on at least one side of the touch area. For example, a design of double-layer conductive lines may be employed for the traces in the trace lead-out area around the touch area. However, this embodiment is not limited thereto.

In some exemplary implementations, the plurality of touch electrodes are in an electrode area within a touch area, and the plurality of traces extend from a lead area within the touch area to a trace lead-out area on at least one side of the touch area. For example, a design of double-layer conductive lines may be employed for the traces in the lead-out area around the touch area and the traces connected with the touch electrodes in the lead area of the touch area. However, this embodiment is not limited thereto.

In some exemplary implementations, the substrate may be an Organic Light-Emitting Diode (OLED) display substrate. However, this embodiment is not limited thereto. For example, the substrate may be a Plasma Display Panel (PDP) display substrate or an Electro-Phoretic Display (EPD) display substrate.

The touch panel provided according to the embodiment will be illustrated by some examples below.

Figure 1:
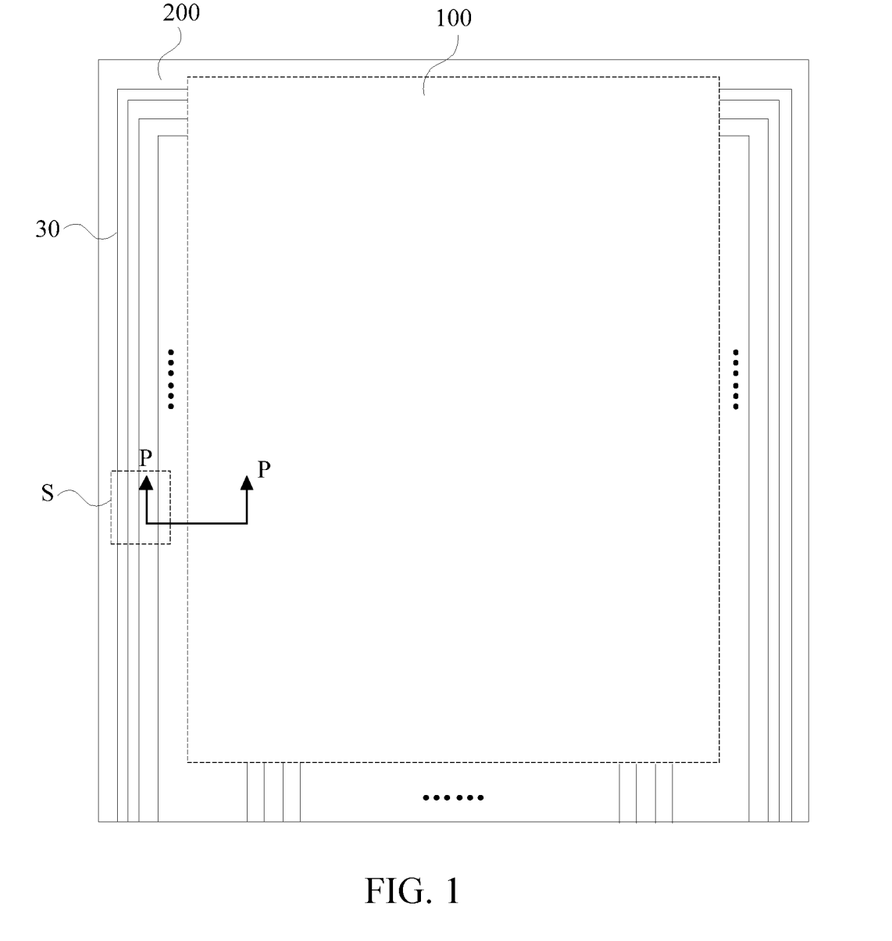
FIG. 1 is a schematic diagram of a structure of a touch panel according to at least one embodiment of the present disclosure.

FIG. 1 is a schematic diagram of a structure of a touch panel according to at least one embodiment of the present disclosure. As shown in FIG. 1, the touch panel according to the exemplary embodiment includes a touch area 100 and a trace lead-out area 200 around the touch area 100. In some examples, the touch panel may be of a mutual capacitance structure or a self-capacitance structure. In some examples, the trace lead-out area 200 may surround the touch area 100. However, this embodiment is not limited thereto. For example, the trace lead-out area 200 may be on at least one side of the touch area 100, e.g. the left side, the right side, the lower side, the left and right sides, or the upper and lower sides of the touch area 100.

In some examples, the touch area 100 includes a plurality of touch electrodes disposed on the substrate. The trace lead-out area 200 includes a plurality of traces 30 disposed on the substrate. The touch panel further includes a bonding area (not shown) on one side of the touch area 100. A first end of at least one trace 30 is connected with a touch electrode within the touch area 100 or a touch trace connected with the touch electrode, and a second end of the trace 30 may extend to the bonding area. The bonding area may include a circuit area and a bonding pin area, wherein the circuit area may be provided with a multiplexer (MUX) circuit, a plurality of input lines and a plurality of output lines. The multiplexer circuit is configured to select from the plurality of output lines to reduce a quantity of output lines. The bonding pin area is provided with a plurality of pins, through which the multiplexer circuit is connected with a plurality of input lines. The plurality of pins are configured to be connected with an external control apparatus through a bonding Flexible Printed Circuit (FPC). However, this embodiment is not limited thereto. In some examples, the circuit area may be further provided with a Touch and Display Driver Integration (TDDI) circuit.

Figure 2:
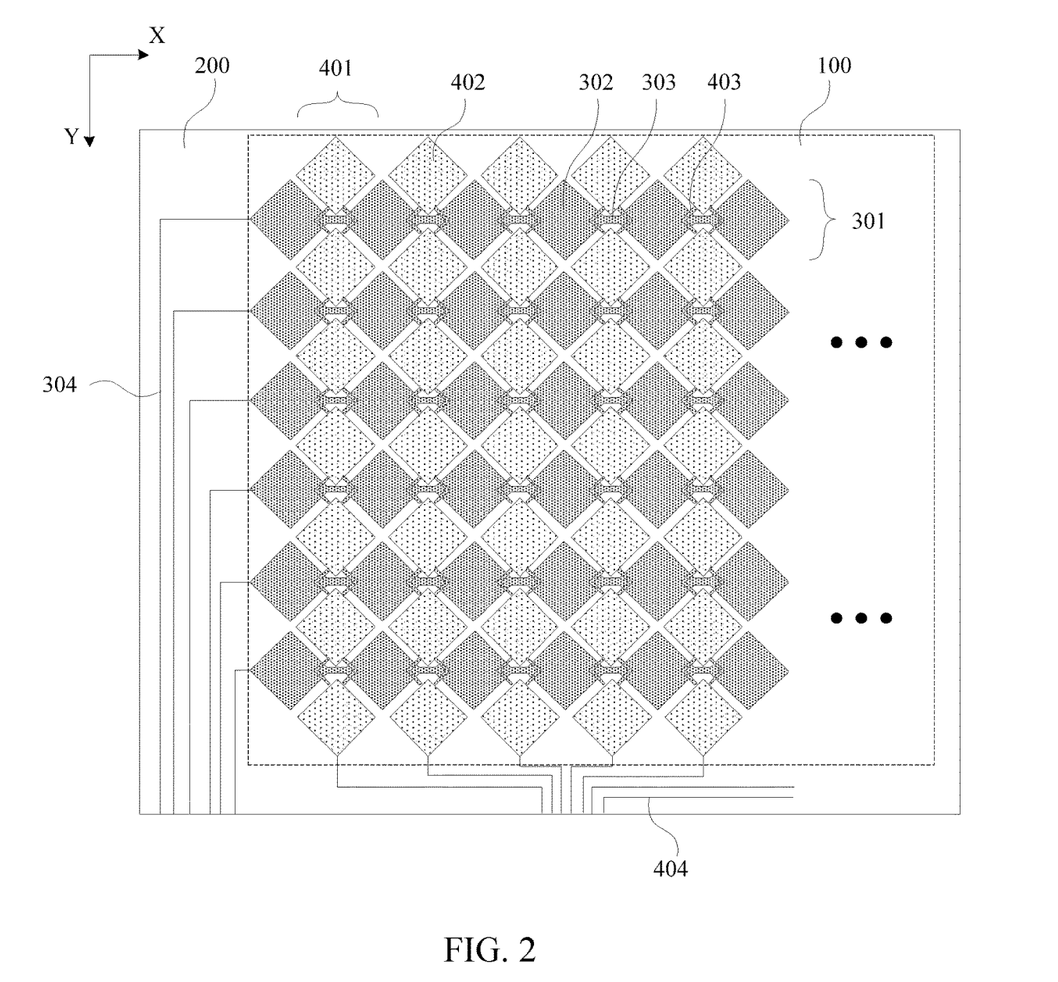
FIG. 2 is a schematic diagram of a structure of a touch area according to at least one embodiment of the present disclosure.

FIG. 2 is a schematic diagram of a structure of a touch area according to at least one embodiment of the present disclosure, which illustrates a mutual capacitance structure. In some exemplary implementations as shown in FIG. 2, the touch area 100 may include a plurality of first touch units 301 and a plurality of second touch units 401 in a plane parallel to the touch panel. The first touch unit 301 is in a line shape extending in a first direction X, and the plurality of first touch units 301 are sequentially arranged in a second direction Y. The second touch unit 401 is in a line shape extending in the second direction Y, and the plurality of second touch units 401 are sequentially arranged in the first direction X. Each first touch unit 301 includes a plurality of first touch electrodes 302 and first connecting parts 303 which are arranged sequentially in the first direction X, wherein the first touch electrodes 302 and the first connecting parts 303 are alternately disposed and connected in sequence. Each second touch unit 401 includes a plurality of second touch electrodes 402 provided in the second direction Y, wherein the plurality of second touch electrodes 402 are disposed at intervals, and adjacent second touch electrodes 402 are connected via a second connecting part 403. A film on which the second connecting parts 403 are located is different from films on which the first touch electrode 302 and the second touch electrode 402 are located.

In some exemplary implementations as shown in FIG. 2, the plurality of traces disposed within the trace lead-out area 200 around the touch area 100 include a plurality of first traces 304 and a plurality of second traces 404. Each first touch unit 301 extends to the bonding area via the first trace 304 disposed on one or both sides of the touch area 100. Each second touch unit 401 extends to the bonding area via the second trace 404 disposed on a side of the touch area 100 adjacent to the bonding area.

In some exemplary implementations, the plurality of first touch electrodes 302, the plurality of second touch electrodes 402, and the plurality of first connecting parts 303 may be disposed on a same layer, i.e., a touch layer, and may be formed by a same patterning process. The first touch electrode 302 and the first connecting part 303 may be connected with each other to be of an integrated structure. The second connecting parts 403 may be disposed on a bridge layer, and adjacent second touch electrodes 402 are connected with each other through a via. An insulating layer is provided between the touch layer and the bridge layer. The bridge layer may be on a side of the touch layer close to the substrate, or may be on a side of the touch layer away from the substrate. However, this embodiment is not limited thereto. In some examples, the plurality of first touch electrodes 302, the plurality of second touch electrodes 402, and the plurality of second connecting parts 403 may be disposed on a same layer, i.e., the touch layer. The second touch electrodes 402 and the second connecting parts 403 may be connected with each other to be of an integrated structure. The first connecting parts 303 may be disposed on the bridge layer and adjacent first touch electrodes 302 are connected with each other through a via. In some examples, the first touch electrode 302 may be a driving electrode (Tx) and the second touch electrode 402 may be a sensing electrode (Rx). Alternatively, the first touch electrode 302 may be a sensing electrode (Rx) and the second touch electrode 402 may be a driving electrode (Tx). In some examples, the first touch electrode 302 and the second touch electrode 402 may be of a regular pattern of about 4 mm*4 mm or 5 mm*5 mm, which may be a rectangle, a rhombus, a triangle or a polygon, or the like. In the exemplary implementation, the first touch electrode 302 and the second touch electrode 402 overlap each other to form a mutual capacitance and position detection is performed using the change of the mutual capacitance. Mutual capacitance touch panel is of a multi-layer structure and has the characteristics of multi-touch.

Figure 3:
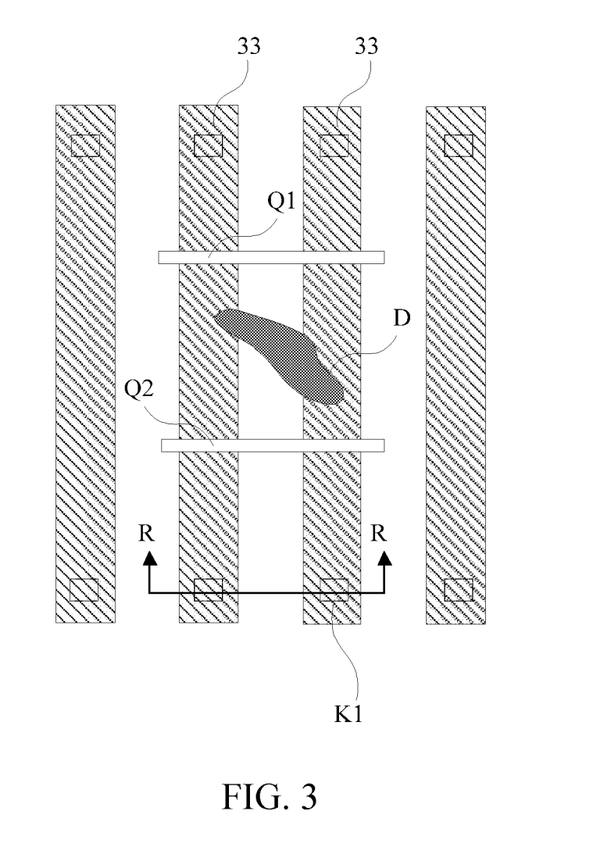
FIG. 3 is a partial enlarged schematic diagram of an area S in FIG. 1.
Figure 4:
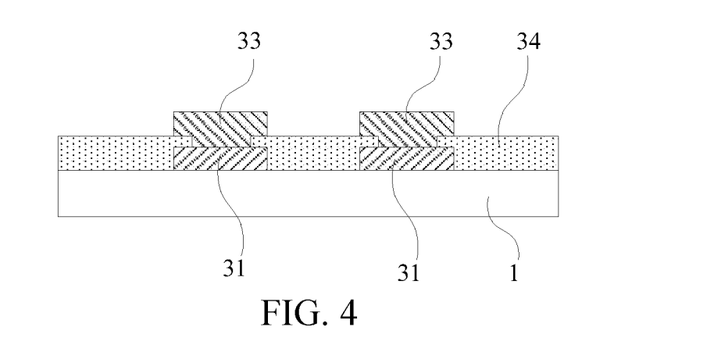
FIG. 4 is a schematic sectional view along an R-R direction in FIG. 3.

FIG. 3 is a partial enlarged schematic diagram of an area S in FIG. 1. FIG. 4 is a schematic sectional view along an R-R direction in FIG. 3. As shown in FIG. 3, a spacing between two adjacent traces in the trace lead-out area may be greater than or equal to 2 microns, for example, the spacing between two adjacent traces may be 2 microns or 5 microns. A width of at least one trace may range from 2 microns to 50 microns, for example, 5 microns. However, this embodiment is not limited thereto. In the present disclosure, the width of the trace represents a length in a direction perpendicular to an extension direction of the trace.

As shown in FIGS. 3 and 4, in a plane perpendicular to the touch panel, one trace includes a first conductive line 31 and a second conductive line 33 that are stacked on the substrate 1. A trace insulating layer 34 is provided between the first conductive line 31 and the second conductive line 33. The second conductive line 33 of the one trace is connected with a corresponding first conductive line 31 through a plurality of vias K1 on the trace insulating layer 34. In some examples, a first end of the first conductive line of one trace may be connected to a touch electrode in the touch area, a second end of the first conductive line extends to the bonding area, and both first and second ends of the second conductive line of the same trace are connected to the corresponding first conductive line. Alternatively, a first end of the second conductive line of one trace may be connected to a touch electrode in the touch area, a second end of the second conductive line extends to the bonding area, and both first and second ends of the first conductive line of the same trace are connected to the corresponding second conductive line. However, this embodiment is not limited thereto.

In some examples as shown in FIGS. 3 and 4, orthographic projections of the first conductive line 31 and the second conductive line 33 of the same trace on the substrate 1 may be completely coincident. However, this embodiment is not limited thereto. In some examples, orthographic projections of the first and second conductive lines of the same trace on the substrate may partially coincide. For example, the orthographic projections of the first conductive line and the second conductive line of the same trace on the substrate may be misaligned such that the orthographic projections of the first conductive line and the second conductive line on the substrate partially coincide. Alternatively, the widths of the first conductive line and the second conductive line of the same trace may be different such that the orthographic projections of the first conductive line and the second conductive line on the substrate partially coincide.

In some exemplary implementations as shown in FIGS. 3 and 4, a second conductive line 33 and a first conductive line 31 of at least one trace may be connected through a plurality of vias K1 arranged sequentially along the extension direction of the trace. In other words, there may be a plurality of connection points between the first conductive line and the second conductive line of the same trace. In this way, when there is a short in first conductive lines or second conductive lines of adjacent traces, a plurality of break points may be formed by cutting multiple times to disconnect the short-circuited adjacent first conductive lines from the corresponding second conductive lines, or the short-circuited adjacent second conductive lines from the corresponding first conductive lines, thereby ensuring the stability of a signal transmission path. In some examples as shown in FIG. 3, connecting lines for the vias K1 of a plurality of adjacent traces are perpendicular to the extension direction of the traces. In some examples, an orthographic projection of the via K1 on the substrate may be a rectangle. However, this embodiment is not limited thereto. For example, the orthographic projection of the via on the substrate may be of another shape, such as a circle or an ellipse.

In some exemplary implementations, as shown in FIG. 3, there is a second short-circuit point between the second conductive lines 33 of two adjacent traces. The second short-circuit point includes a second conductive block D between two adjacent second conductive lines 33, and the second conductive block D is disposed on a trace insulating layer between the two adjacent second conductive lines 33. The second conductive block D is in contact with the two adjacent second conductive lines 33, and is insulated from the first conductive line. Each of the second conductive lines 33 of the two adjacent traces has a third break point Q1 and a fourth break point Q2 such that the second conductive block D of the second short-circuit point is isolated from first conductive lines to which the second conductive lines 33 of the two adjacent traces are connected. The third break point Q1 and the fourth break point Q2 of the two adjacent second conductive lines 33 are located on two sides of the second conductive block D in the extension direction of the second conductive line 33, for example, the extension direction of the third break point Q1 and the fourth break point Q2 is perpendicular to the extension direction of the second conductive line 33. Moreover, the second conductive lines between the third break point Q1 and the fourth break point Q2 are not electrically connected with the corresponding first conductive lines, so that the second conductive lines connected to the second conductive block D are isolated from the second conductive lines and the first conductive lines for transmitting signals, preventing the second short-circuit point from affecting the signal transmission on the traces. In this exemplary embodiment, since a design of double-layer conductive lines is employed for the traces, when one layer of conductive lines is short-circuited, the one layer of conductive lines is cut off, so that a short-circuited part of the one layer of conductive lines is disconnected from the other layer of conductive lines, thus avoiding affecting overall transmission performance of traces, and effectively repairing a problem of short-circuited traces in a manufacturing process of the touch panel.

Figure 5:
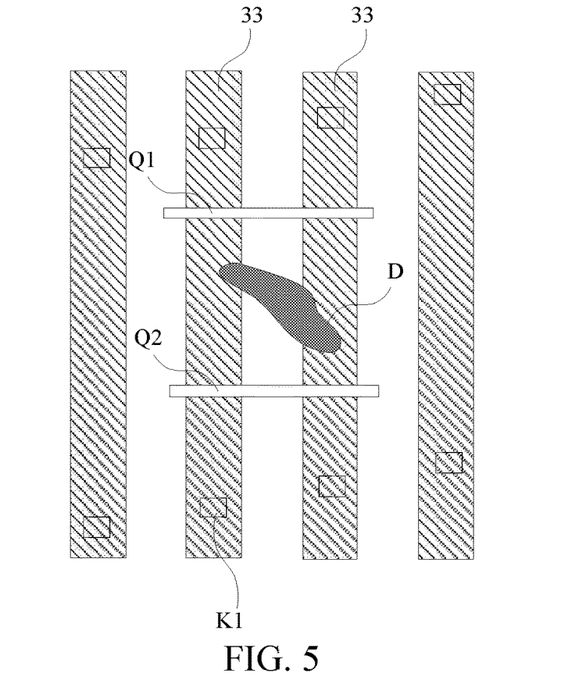
FIG. 5 is another partial enlarged schematic diagram of the area S in FIG. 1.

FIG. 5 is another partial enlarged schematic diagram of the area S in FIG. 1. In some exemplary implementations, as shown in FIG. 5, the vias K1 of a plurality of traces are staggered in a direction perpendicular to the extension direction of the traces. In other words, the connecting lines for the vias K1 of the plurality of traces are not perpendicular to the extension direction of the traces. The rest of the structure of the display panel according to the embodiment may be referred to descriptions of the aforementioned embodiments, and will not be repeated here.

Figure 6:
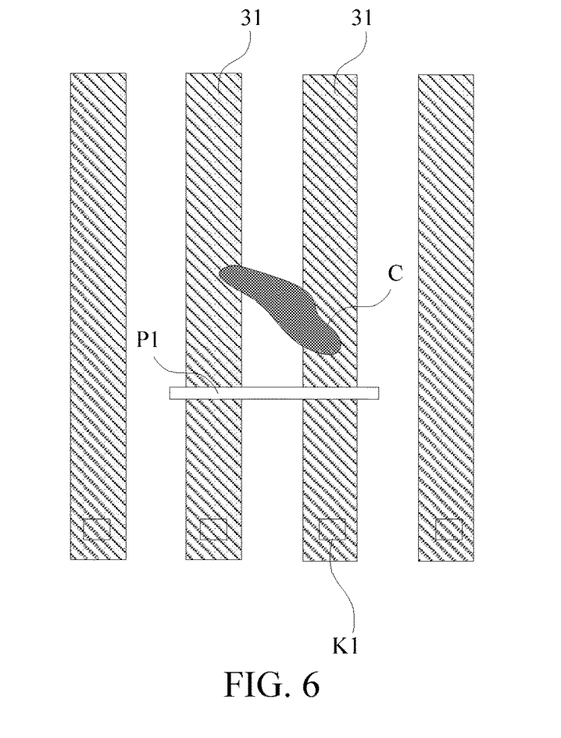
FIG. 6 is another partial enlarged schematic diagram of the area S in FIG. 1.

FIG. 6 is another partial enlarged schematic diagram of the area S in FIG. 1. In some exemplary implementations, the traces within the trace lead-out area include the first conductive lines 31 and the second conductive lines that are stacked on the substrate. A trace insulating layer is provided between the first conductive lines 31 and the second conductive lines. A second conductive line of one trace is connected with a corresponding first conductive line through one via K1 on the trace insulating layer. A first end of the second conductive line of the trace may be connected with the touch electrode, and a second end of the second conductive line may extend to the bonding area. In this example, there may be only one connection point between the second conductive line and the first conductive line 31 of the same trace. For example, at the connection point, the second conductive line may be connected with the first conductive line through a via or a group of vias. In some examples, a connection point between the first conductive line and the second conductive line of the same trace may be located at an end of the first conductive line near the touch electrode, or may be located at an end near the bonding area, or may be located at a midpoint position of the first conductive line in the extension direction. However, this embodiment is not limited thereto.

As shown in FIG. 6, there is a first short-circuit point between the first conductive lines 31 of two adjacent traces. The first short-circuit point includes a first conductive block C between two adjacent first conductive lines 31, and the first conductive block C is covered with a trace insulating layer. The first conductive block C is in contact with two adjacent first conductive lines 31 and is insulated from the second conductive line. Each of the first conductive lines 31 of the two adjacent traces has a first break point P1 such that the first conductive block C of the first short-circuit point is isolated from second conductive lines to which the first conductive lines 31 of the two adjacent traces are connected. The first break point P1 of the two adjacent first conductive lines 31 is located between the first conductive block C and the connection point of the first conductive line 31 and the corresponding second conductive line (for example, the position corresponding to the via K1), so that the electrical connection between the first short-circuit point and the second conductive line can be cut off, preventing the short of the first conductive line from affecting the signal transmission on the traces.

Figure 7:
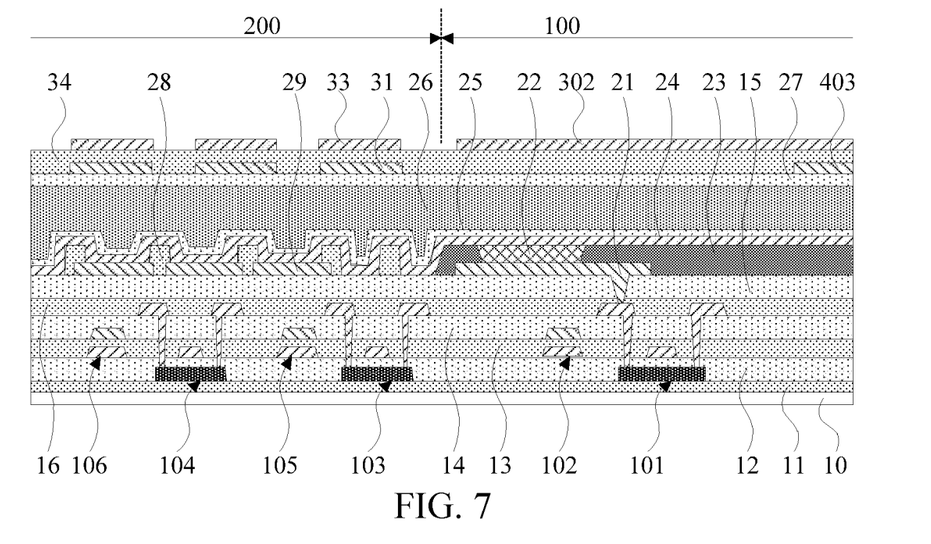
FIG. 7 is a schematic sectional view along a P-P direction in FIG. 1.

In some exemplary implementations, the substrate of the touch panel may be an OLED display substrate. FIG. 7 is a schematic sectional view along a P-P direction in FIG. 1. The following description is made with reference to FIGS. 1, 2 and 7 by taking the substrate being an OLED display substrate and a touch panel having a mutual capacitance structure as an example. In some exemplary implementations, the touch structure (including the touch electrode and the trace) is disposed on the OLED display substrate to form a Flexible Multi-Layer On Cell (FMLOC) structure form in which a display structure is integrated with a touch structure, and the FMLOC structure has advantages such as thinness and foldability, and can meet the product demands of flexible folding, narrow bezel, etc.

In some exemplary implementations, as shown in FIG. 7, in a plane perpendicular to the touch panel, the touch area 100 of the touch panel includes a drive structure layer disposed on a base substrate 10, a light-emitting structure layer disposed on the drive structure layer, and a bridge layer and a touch layer disposed on the light-emitting structure layer. The drive structure layer of the touch area 100 includes a first transistor 101 and a first storage capacitor 102 which form a pixel driving circuit, and the light-emitting structure layer in the touch area 100 includes an anode 21, a pixel definition layer 23, an organic emitting layer 22, a cathode 24 and an encapsulation layer. The bridge layer in the touch area 100 includes, for example, a second connecting part 403. The touch layer of the touch area 100 includes, for example, a first touch electrode 302, a first connecting part 303, and a second touch electrode 402. The trace lead-out area 200 of the touch panel includes a circuit structure layer disposed on the base substrate 10, a power supply connection layer disposed on the circuit structure layer, and a first conductive line layer and a second conductive line layer disposed on the power supply connection layer. The circuit structure layer of the trace lead-out area 200 includes a second transistor 103, a second storage capacitor 105, a third transistor 104, and a third storage capacitor 106, that form a Gate Driver on Array (GOA) circuit. The power supply connection layer of the trace lead-out area 200 includes the cathode 24 and a power supply connection electrode 29 that is configured to connect the cathode 24 and a power supply line (for example, a low-potential power supply line VSS) extending to the bonding area. The first conductive line layer of the trace lead-out area 200 includes a plurality of first conductive lines 31. The second conductive line layer of the trace lead-out area 200 includes a plurality of second conductive lines 33. The plurality of first conductive lines 31 and the plurality of second conductive lines 33 may be connected in one-to-one correspondence. In this example, the first conductive line layer in the trace lead-out area 200 and the bridge layer in the touch area 100 are in a same layer, and the second conductive line layer in the trace lead-out area 200 and the touch layer in the touch area 100 are in a same layer. However, this embodiment is not limited thereto. For example, the first conductive line layer and the touch layer may be in a same layer, and the second conductive line layer and the bridge layer may be in a same layer.

The following is an exemplary description through a manufacturing process of the touch panel. A "patterning process" mentioned in the present disclosure includes coating with a photoresist, mask exposure, development, etching, photoresist stripping, and other treatments for a metal material, an inorganic material, or a transparent conductive material, and includes coating with an organic material, mask exposure, development, and other treatments for an organic material. Deposition may be any one or more of sputtering, evaporation, and chemical vapor deposition. Coating may be any one or more of spray coating, spin coating, and ink-jet printing. Etching may be any one or more of dry etching and wet etching, which is not limited in present disclosure. A "thin film" refers to a layer of thin film made of a material on a base substrate through a process such as deposition and coating. If the "thin film" does not need a patterning process in an entire manufacturing process, the "thin film" may also be called a "layer". If the "thin film" needs a patterning process in an entire manufacturing process, it is called a "thin film" before the patterning process, and called a "layer" after the patterning process. The "layer" after the patterning process includes at least one "pattern". "A and B are arranged on a same layer" described in the present disclosure refers to that A and B are formed simultaneously through a same patterning process. In an exemplary embodiment of the present disclosure, "an orthogonal projection of A includes an orthogonal projection of B" refers to that a boundary of the orthogonal projection of B falls within a boundary of the orthogonal projection of A, or the boundary of the orthogonal projection of A is overlapped with the boundary of the orthogonal projection of B.

In some exemplary implementations, the manufacturing process of the touch panel includes the following operations.

(1) A base substrate 10 is manufactured. In some exemplary implementations, the base substrate 10 may include a first flexible material layer, a first inorganic material layer, a semiconductor layer, a second flexible material layer and a second inorganic material layer which are stacked on a glass carrier plate. The first flexible material layer and the second flexible material layer may be made of polyimide (PI), polyethylene terephthalate (PET), a surface-treated polymer soft film, or the like. The first inorganic material layer and the second inorganic material layer may be made of silicon nitride (SiNx), silicon oxide (SiOx) or the like to improve water and oxygen resistance of the substrate. The first inorganic material layer and the second inorganic material layer may be also referred to as a Barrier layer. The semiconductor layer may be made of amorphous silicon (a-si). However, the embodiment is not limited thereto.

(2) Patterns of a driving structure layer and a circuit structure layer are formed in the touch area 100 and the trace lead-out area 200, respectively.

In some exemplary implementations, the drive structure layer in the touch area 100 includes a first transistor 101 and a first capacitor electrode 102, and the circuit structure layer in the trace lead-out area 200 includes a second transistor 103, a third transistor 104, a second storage capacitor 105 and a third storage capacitor 106. In some examples, a manufacturing process of the drive structure layer and the circuit structure layer may include the following process.

A first insulating layer 11 and a pattern of an active layer disposed on the first insulating layer 11 are formed on the base substrate 10, and the active layer at least includes a first active layer, a second active layer and a third active layer.

A second insulating layer 12 covering the pattern of the active layer and a pattern of a first gate metal layer disposed on the second insulating layer 12 are formed, and the first gate metal layer at least includes a first gate electrode, a second gate electrode, a third gate electrode, a first capacitor electrode, a third capacitor electrode and a fifth capacitor electrode.

A third insulating layer 13 covering the first gate metal layer and a pattern of a second gate metal layer disposed on the third insulating layer 13 are formed, and the pattern of the second gate metal layer at least includes a second capacitor electrode, a fourth capacitor electrode and a sixth capacitor electrode.

A pattern of a fourth insulating layer 14 covering the second gate metal layer is formed, wherein a plurality of first vias are disposed on the fourth insulating layer 14. A pattern of a source/drain metal layer is formed on the fourth insulating layer 14, wherein the source/drain metal layer at least includes a first source electrode, a first drain electrode, a second source electrode, a second drain electrode, a third source electrode and a third drain electrode. The first source electrode and the first drain electrode are respectively connected with the first active layer through the first via, the second source electrode and the second drain electrode are respectively connected with the second active layer through the first via, and the third source electrode and the third drain electrode are respectively connected with the third active layer through the first via. The source/drain metal layer in the trace lead-out area 200 may further include a power supply line, such as a low-potential power supply line VSS.

A fifth insulating layer 16 covering the source/drain metal layer is formed.

(3) A light-emitting structure layer is formed in the touch area 100, and a power supply connection layer is formed in the trace lead-out area 200.

In some exemplary implementations, a pattern of a first flat layer 15 is formed on the base substrate 10 on which the aforementioned patterns are formed, and a second via is disposed on the first flat layer 15 of the touch area 100, and the second via exposes a first drain electrode of the first transistor 101. Then, patterns of the anode 21 and the power supply connection electrode 29 are formed on the base substrate on which the aforementioned patterns are formed.

The anode 21 is formed on the first flat layer 15 of the touch area 100 and connected with the first drain electrode of the first transistor 101 through the second via. The power supply connection electrode 29 is formed on the first flat layer 15 of the trace lead-out area 200, and an end of the power supply connection electrode 29 is connected with the power supply line. A pattern of the pixel definition layer 23 is formed on the base substrate 10 on which the aforementioned patterns are formed. A pixel opening is disposed on the pixel definition layer 23 of the touch area 100, and the pixel opening exposes a surface of the anode 21. A pattern of a plurality of isolation posts 28 are formed in the trace lead-out area 200.

An organic emitting layer 22 and a cathode 24 are sequentially formed on the base substrate 10 where the aforementioned patterns are formed. The organic emitting layer 22 is formed in the pixel opening, and a part of the cathode 24 is formed on the organic emitting layer 22 of the touch area 100, and the other part is formed in the trace lead-out area 200. The cathode 24 in the trace lead-out area 200 is connected with the power supply connection electrode 29. Since the power supply connection electrode 29 is connected with the power supply line, a connection between the cathode 24 and the power supply line is achieved.

The encapsulation layer is formed on the base substrate 10 where the aforementioned patterns are formed, wherein the encapsulation layer includes a first encapsulation layer 25, a second encapsulation layer 26 and a third encapsulation layer 27 which are stacked. The first encapsulation layer 25 is made of an inorganic material and covers the cathode 24 in the touch area 100 and the trace lead-out area 200. The second encapsulation layer 26 is made of an organic material and the third encapsulation layer 27 is made of an inorganic material and covers the first encapsulation layer 25 and the second encapsulation layer 26.

After the patterning process, a pattern of the light-emitting structure layer in the touch area 100 is manufactured, and a pattern of the power supply connection layer in the trace lead-out area 200 is manufactured.

(4) A bridge layer and a touch layer are sequentially formed in the touch area 100, and a first conductive line layer and a second conductive line layer are sequentially formed in the trace lead-out area 200.

In some exemplary implementations, a first conductive film is deposited on a base substrate 10 where the aforementioned patterns are formed, and the first conductive film is patterned by a patterning process to form a pattern of the first conductive line layer and a pattern of the bridge layer. The bridge layer in the touch area 100 includes a plurality of second connecting parts 403. The first conductive line layer in the trace lead-out area 200 includes a plurality of first conductive lines 31. After the first conductive line layer is formed and when it is detected that there is at least one first short-circuit point in the first conductive line layer, at least two adjacent first conductive lines to which the first conductive block at the first short-circuit point is connected may be cut so that the first short-circuit point is isolated from the at least two adjacent first conductive lines. For example, for the first conductive line connected to the first short-circuit point, cutting may be performed between positions of the first conductive block and the connected second conductive line corresponding to the first conductive line, so as to avoid forming an electrical connection between the first conductive block and the second conductive line connected to the first conductive line.

In some exemplary implementations, a trace insulating layer 34 covering the first conductive line layer is formed on the base substrate 10 where the aforementioned patterns are formed, a second conductive film is deposited on trace insulating layer 34, and the second conductive film is patterned by a patterning process to form a pattern of the second conductive line layer and a pattern of the touch layer. The second conductive line layer is formed in the trace lead-out area 200 and the pattern of the second conductive line layer at least includes a plurality of second conductive lines 33. The touch layer is formed in the touch area 100 and the pattern of the touch layer at least includes a plurality of first touch electrodes 302 and a plurality of second touch electrodes 402. For example, a via exposing both ends of the first conductive line is formed on the trace insulating layer of the trace lead-out area, and the second conductive line may be connected to both ends of the corresponding first conductive line through the via. One end of the second conductive line may be integrated with the touch electrode in the touch area to form an integrated structure, and the other end of the second conductive line may be extended to the bonding area. However, the embodiment is not limited thereto.

In some exemplary implementations, after the second conductive line layer is formed and when it is detected that there is at least one second short-circuit point in the second conductive line layer, at least two adjacent second conductive lines to which the second conductive block at the second short-circuit point is connected may be cut so that the second short-circuit point is isolated from the at least two adjacent second conductive lines. For example, for the second conductive line to which the second conductive block at the second short-circuit point is connected, cutting may be performed between the connection position of the second conductive line with the corresponding first conductive line and the second short-circuit point, such that the second short-circuit point is disconnected from the second conductive line, and at a disconnected position of the second conductive line, a signal on the trace can be transmitted through a path between the second conductive line and the first conductive line, thereby ensuring the transmission performance of the signal on the trace.

In the exemplary implementation, the detection and repairing of a short-circuited trace can be achieved in the manufacturing process of the touch panel, and a short-circuit problem existing in the manufacturing process of the trace of the touch panel can be effectively repaired, thereby effectively improving the yield of the touch panel.

In some exemplary implementations, the first insulating layer 11, the second insulating layer 12, the third insulating layer 13, the fourth insulating layer 14, and the fifth insulating layer 16 may be made of any one or more of Silicon Oxide (SiOx), Silicon Nitride (SiNx), and Silicon OxyNitride (SiON), and may be a single layer, a multi-layer, or a composite layer. The first insulating layer 11 is referred to as a buffer layer to improve the moisture and oxygen resistance of the base substrate 10, the second insulating layer 12 and the third insulating layer 13 are referred to as a Gate Insulation (GI) layer, the fourth insulating layer 14 is referred to as an interlayer insulating (ILD) layer, and the fifth insulating layer 16 is referred to as a Passivation (PVX) layer. The first flat layer 15 may be made of an organic material. The first gate metal layer, the second gate metal layer and the source/drain metal layer may be made of a metal material, such as any one or more of silver (Ag), copper (Cu), aluminum (Al), titanium (Ti) and molybdenum (Mo), or alloy of the above metals, such as aluminum neodymium alloy (AlNd) or molybdenum niobium alloy (MoNb), and may be a single-layered structure or a multi-layered composite structure, such as Ti/Al/Ti. The anode 21 may be made of a transparent conductive material, e.g., Indium Tin Oxide (ITO) or Indium Zinc Oxide (IZO). The pixel definition layer 23 may be made of an organic material, such as polyimide, acrylic, or polyethylene terephthalate. The cathode 24 may be made of any one or more of magnesium (Mg), silver (Ag), aluminum (Al), copper (Cu) and lithium (Li), or an alloy made of any one or more of the above metals. An active layer thin film may be made of an amorphous Indium Gallium Zinc Oxide (a-IGZO), Zinc OxyNitride (ZnON), Indium Zinc Tin Oxide (IZTO), amorphous Silicon (a-Si), polycrystalline Silicon (p-Si), hexathiophene, polythiophene and other materials, that is, the present disclosure is applicable to transistors manufactured based on an oxide technology, a silicon technology, and an organic matter technology. The first conductive film and the second conductive film may be made of any one or more of magnesium (Mg), silver (Ag), aluminum (Al), copper (Cu) and lithium (Li), or of an alloy made of any one or more of the aforementioned metals, or of Indium Tin Oxide (ITO) or Indium Zinc Oxide (IZO) and other transparent conductive materials. However, the embodiment is not limited thereto.

The structure and the manufacturing process of the touch panel provided according to the exemplary embodiments of the present disclosure are merely illustrative. In an exemplary implementation, according to actual requirements, the corresponding structure may be changed and the patterning process may be increased or reduced, for example the transistor and the anode may be connected by a connection electrode. For another example, the touch structure may be a self-capacitance structure, that is, a touch layer including a touch electrode is disposed in the touch area, and the first conductive line layer and the touch layer are in a same layer, or the second conductive line layer and the touch layer are in a same layer. However, the present disclosure is not limited thereto.

In the exemplary implementation, a design of double-layer conductive lines is employed for the traces in the trace lead-out area, and when a short occurs between adjacent traces, a signal transmission path of the traces is ensured by cutting off one layer of the conductive lines of the traces, thereby improving the yield of the touch panel.

The manufacturing process according to the embodiments of the present disclosure may be achieved by using the existing mature manufacturing equipment, may be well compatible with the existing manufacturing process, and has advantages of simple process realization, easy implementation, high production efficiency, low production cost and high yield.

Figure 8:
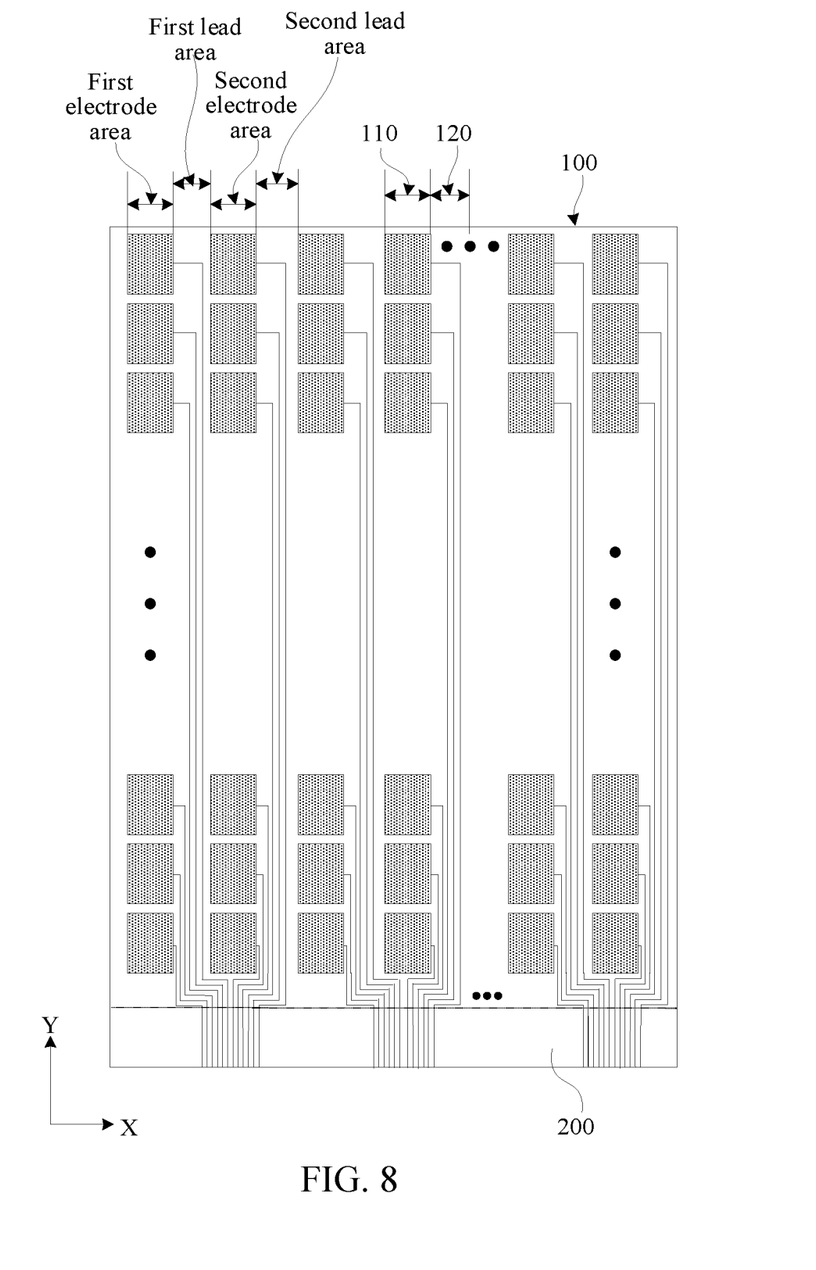
FIG. 8 is a schematic diagram of another structure of a touch panel according to at least one embodiment of the present disclosure.

FIG. 8 is a schematic diagram of another structure of the touch panel according to at least one embodiment of the present disclosure, and FIG. 8 illustrates a self-capacitance structure. The self-capacitance structure is of a self-capacitance formed by a touch electrode and a human body, and changes of the self-capacitance are used for position detection. A self-capacitance touch panel is of a single-layer structure, and has characteristics of low power consumption, and simple structure, etc. During operation, a touch by a finger of a person will cause self-capacitance of a corresponding touch electrode to change, and an external control device may determine a position of the finger according to the change of the capacitance of the touch electrode.

As shown in FIG. 8, in a plane parallel to the touch panel, the touch panel includes a touch area 100 and a trace lead-out area 200 located on one side of the touch area 100. The touch area 100 includes a plurality of touch electrodes arranged regularly. In some examples, the touch electrodes are rectangular and arranged in a matrix of M rows*N columns. The touch area 100 may be divided into N electrode areas 110 and N lead areas 120. The electrode areas 110 and lead areas 120 are strip-shaped areas extending along the first direction X, and the strip-shaped electrode areas 110 and the strip-shaped lead areas 120 are alternately disposed along a second direction Y, i.e., one lead area 120 is disposed between two electrode areas 110 and one electrode area 110 is disposed between two lead areas 120, except for the electrode areas and lead areas at edge positions. Each electrode area 110 includes M touch electrodes sequentially disposed in the first direction X and each lead area 120 includes M traces sequentially disposed in the second direction Y. At least one trace includes a first conductive line and a second conductive line stacked on the substrate. For example, a first end of the first conductive line (or the second conductive line) is connected to a touch electrode, and a second end extends in the first direction X to the trace lead-out area 200 until it extends to the bonding area.

In some exemplary implementations, a design of double-layer conductive lines may be employed for the traces in the lead area 120 and the trace lead-out area 200, and when a short occurs between adjacent traces, a signal transmission path of the traces is ensured by cutting off one layer of the conductive lines of the traces, thereby improving the yield of the touch panel.

In the present exemplary implementation, reference may be made to the embodiment in FIG. 3, FIG. 5, or FIG. 6 for a repairing method in case of a short circuit, and reference may be made to the embodiment shown in FIG. 7 for a structure of a substrate, and those will not be repeated herein.

A method for repairing a touch panel is further provided in at least one embodiment of the present disclosure. The touch panel includes a substrate, a plurality of touch electrodes and a plurality of traces disposed on the substrate, and at least one trace is connected with at least one touch electrode. At least one trace includes a first conductive line and a second conductive line stacked on the substrate, a trace insulating layer is disposed between the first conductive line and the second conductive line, and the second conductive line is connected with the first conductive line through at least one via on the trace insulating layer. The method for repairing the touch panel includes at least one of the followings: after the first conductive line is formed on the substrate, cutting at least two adjacent first conductive lines connected with the first short-circuit point, and sequentially forming a trace insulating layer and a second conductive line on a side of the first conductive line far away from the substrate, to enable the first short-circuit point to be isolated from second conductive lines corresponding to the at least two adjacent first conductive lines; after the first conductive line, the trace insulating layer and the second conductive line are sequentially formed on the substrate, cutting at least two adjacent second conductive lines connected to the second short-circuit point to enable the second short-circuit point to be isolated from first conductive lines corresponding to the at least two adjacent second conductive lines.

In some exemplary implementations, the cutting at least two adjacent first conductive lines connected with the first short-circuit point, includes: cutting at least two adjacent first conductive lines connected with the first short-circuit point, forming a first break point and a second break point on the at least two adjacent first conductive lines to enable a first conductive line between the first break point and the second break point to be not electrically connected with the corresponding second conductive line.

In some exemplary embodiments, the cutting at least two adjacent second conductive lines connected to the second short-circuit point, includes: cutting at least two adjacent second conductive lines connected to the second short-circuit point, forming a third break point and a fourth break point on the at least two adjacent second conductive lines to enable the second conductive line between the third break point and the fourth break point to be not electrically connected with the corresponding first conductive line.

The method for repairing the touch panel according to this embodiment may refer to the descriptions in the aforementioned embodiments, which will not be repeated herein.

Figure 9:
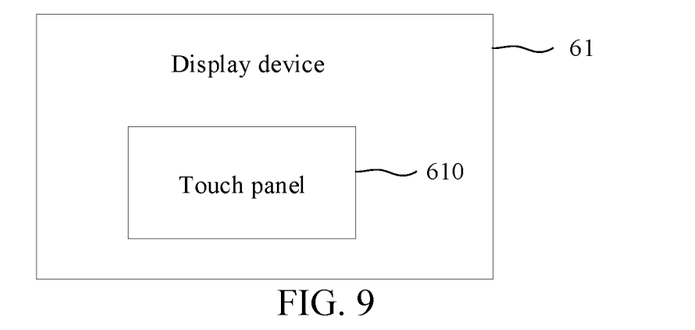
FIG. 9 is a schematic diagram of a display device according to at least one embodiment of the present disclosure.

FIG. 9 is a schematic diagram of a display device according to at least one embodiment of the present disclosure. As shown in FIG. 9, a display device 61 according to the embodiment includes a touch panel 610 according to the aforementioned embodiments. The display device 61 may be any product or component with display and touch functions, such as a mobile phone, a tablet computer, a television, a display, a notebook computer, a digital photo frame, and a navigator. However, the embodiment is not limited thereto.

The drawings of the present disclosure only involve structures involved in the present disclosure, and other structures may refer to conventional designs. The embodiments of the present disclosure and features in the embodiments may be combined to each other to obtain new embodiments if there is no conflict. Those of ordinary skills in the art should understand that modifications or equivalent replacements may be made to the technical solutions of the present disclosure without departing from the spirit and scope of the technical solutions of the present disclosure, and shall all fall within the scope of the claims of the present disclosure.

The invention claimed is:

1. A touch panel comprising a substrate, a plurality of touch electrodes and a plurality of traces disposed on the substrate, wherein
    at least one trace is connected with at least one touch electrode;
    the at least one trace comprises a first conductive line and a second conductive line that are stacked on the substrate, a trace insulating layer is disposed between the first conductive line and the second conductive line, and the second conductive line is connected with the first conductive line through at least one via on the trace insulating layer, both first and second ends of the first conductive line of a same trace are connected to a corresponding second conductive line;
    each of first conductive lines of at least two adjacent traces has at least one break point, to enable a first short-circuit point between the first conductive lines of the at least two adjacent traces to be isolated from corresponding second conductive lines; or, each of second conductive lines of at least two adjacent traces has at least one break point to enable a second short-circuit point between the second conductive lines of the at least two adjacent traces to be isolated from corresponding first conductive lines.

2. The touch panel of claim 1, wherein the first short-circuit point comprises a first conductive block between two adjacent first conductive lines, and the first conductive block is covered with a trace insulating layer; and
    the second short-circuit point comprises a second conductive block between two adjacent second conductive lines, and the second conductive block is disposed on a trace insulating layer between the two adjacent second conductive lines.

3. The touch panel of claim 2, wherein the plurality of touch electrodes are in a touch area, and the plurality of traces are in a trace lead-out area on at least one side of the touch area.

4. The touch panel of claim 1, wherein an orthographic projection of a first conductive line of the at least one trace on the substrate comprises an orthographic projection of a corresponding second conductive line on the substrate; or, an orthographic projection of a second conductive line of the at least one trace on the substrate comprises an orthographic projection of a corresponding first conductive line on the substrate.

5. The touch panel of claim 4, wherein the plurality of touch electrodes are in a touch area, and the plurality of traces are in a trace lead-out area on at least one side of the touch area.

6. The touch panel of claim 1, wherein the first conductive line and the touch electrode are in a same layer, or, the second conductive line and the touch electrode are in a same layer.

7. The touch panel of claim 6, wherein the touch electrode comprises a driving electrode and a sensing electrode; adjacent driving electrodes are connected by a first connecting part, or, adjacent sensing electrodes are connected by a first connecting part;
the first conductive line and the touch electrode are in a same layer, and the second conductive line and the first connecting part are in a same layer; or, the second conductive line and the touch electrode are in a same layer, and the first conductive line and the first connecting part are in a same layer.

8. The touch panel of claim 7, wherein the plurality of touch electrodes are in a touch area, and the plurality of traces are in a trace lead-out area on at least one side of the touch area.

9. The touch panel of claim 6, wherein the plurality of touch electrodes are in a touch area, and the plurality of traces are in a trace lead-out area on at least one side of the touch area.

10. The touch panel of claim 1, wherein the second conductive line of the at least one trace is connected with the first conductive line through a plurality of vias arranged sequentially along an extension direction of the at least one trace.

11. The touch panel of claim 10, wherein each of the first conductive lines of the at least two adjacent traces has a first break point and a second break point, and a first conductive line between the first break point and the second break point is not connected with a corresponding second conductive line; or
each of the second conductive lines of the at least two adjacent traces has a third break point and a fourth break point, and a second conductive line between the third break point and the fourth break point is not connected with a corresponding first conductive line.

12. The touch panel of claim 10, wherein the plurality of touch electrodes are in a touch area, and the plurality of traces are in a trace lead-out area on at least one side of the touch area.

13. The touch panel of claim 1, wherein vias of the plurality of traces are staggered in a direction perpendicular to an extension direction of the traces.

14. The touch panel of claim 1, wherein the plurality of touch electrodes are in a touch area, and the plurality of traces are in a trace lead-out area on at least one side of the touch area.

15. The touch panel of claim 1, wherein the plurality of touch electrodes are in an electrode area within a touch area, and the plurality of traces extend from a lead area within the touch area to a trace lead-out area on at least one side of the touch area.

16. The touch panel of claim 1, wherein the substrate is an Organic Light-Emitting Diode (OLED) display substrate.

17. A display device, comprising the touch panel of claim 1.

18. A method for repairing a touch panel, wherein the touch panel comprises a substrate, a plurality of touch electrodes and a plurality of traces disposed on the substrate, wherein at least one trace is connected with at least one touch electrode; the at least one trace comprises a first conductive line and a second conductive line that are stacked on the substrate, a trace insulating layer is disposed between the first conductive line and the second conductive line, and the second conductive line is connected with the first conductive line through at least one via on the trace insulating layer, both first and second ends of the first conductive line of a same trace are connected to a corresponding second conductive line;
the method for repairing the touch panel comprises at least one of the followings:
after the first conductive line is formed on the substrate, cutting at least two adjacent first conductive lines connected with a first short-circuit point, sequentially forming a trace insulating layer and a second conductive line on a side of the first conductive line far away from the substrate, to enable the first short-circuit point to be isolated from second conductive lines corresponding to the at least two adjacent first conductive lines;
after the first conductive line, the trace insulating layer and the second conductive line are sequentially formed on the substrate, cutting at least two adjacent second conductive lines connected with a second short-circuit point to enable the second short-circuit point to be isolated from first conductive lines corresponding to the at least two adjacent second conductive lines.

19. The method for repairing the touch panel of claim 18, wherein the cutting at least two adjacent first conductive lines connected with the first short-circuit point comprises:
cutting the at least two adjacent first conductive lines connected with the first short-circuit point, forming a first break point and a second break point on the at least two adjacent first conductive lines, to enable a first conductive line between the first break point and the second break point to be not electrically connected with a corresponding second conductive line.

20. The method for repairing the touch panel of claim 18, wherein the cutting at least two adjacent second conductive lines connected with the second short-circuit point comprises:
cutting the at least two adjacent second conductive lines connected with the second short-circuit point, forming a third break point and a fourth break point on the at least two adjacent second conductive lines, to enable a second conductive line between the third break point and the fourth break point to be not electrically connected with a corresponding first conductive line.

* * * * *